Nov. 28, 1950     J. A. CHENICEK     2,531,767
PROCESS FOR THE DESULFURIZATION OF HYDROCARBONS
Filed July 12, 1946
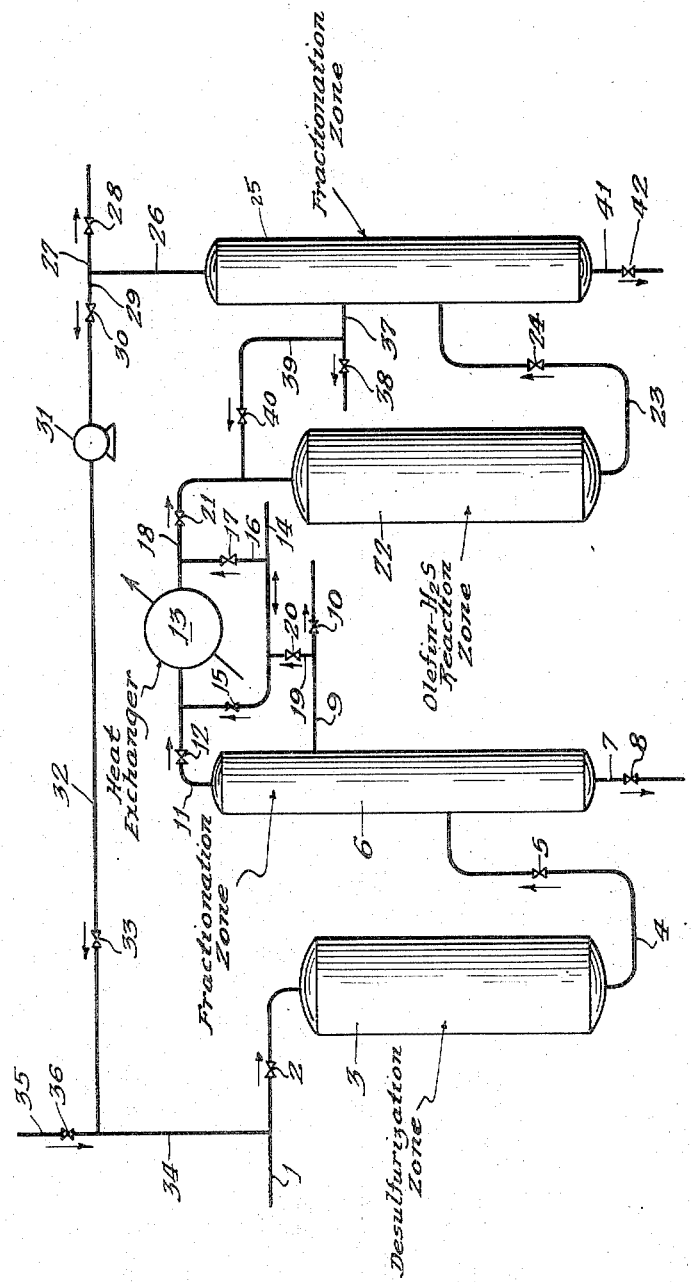
INVENTOR.
Joseph A. Chenicek
BY
Maynard P. Venema
Attorney Patented Nov. 28, 1950

2,531,767

UNITED STATES PATENT OFFICE 2,531,767

PROCESS FOR THE DESULFURIZATION OF HYDROCARBONS

Joseph A. Chenicek, Riverside, Ill., assignor to Universal Oil Products Company, Chicago, Ill., a corporation of Delaware Application July 12, 1946, Serial No. 682,978

8 Claims. (Cl. 196—24)

This invention relates to a combination process for the desulfurization of hydrocarbon distillates and at the same time producing valuable organo-sulfur compounds.

Sulfur compounds in hydrocarbon distillates and particularly straight run gasoline, crack gasoline, kerosene, gas oil, fuel oil, etc., are objectionable since they impart undesirable properties to the hydrocarbon distillates. For example, in gasoline sulfur compounds impart objectionable odor, poor color stability, corrosiveness, poor octane number, poor lead susceptibility and poor gum stability thereto. In kerosene the sulfur compounds impart poor octane, corrosiveness, smoking, undesirable wick deposits and poor color stability. In higher boiling distillates the sulfur compounds impart corrosiveness, poor color stability, decrease in the utility of gas oil for use as Diesel fuel, and will form sulfur compounds during the conversion of the higher boiling oils into lower boiling hydrocarbons.

Hydrocarbon distillates containing sulfur compounds may be subjected to treatment in the presence of hydrogen and a suitable catalyst in order to convert the organic sulfur compounds into hydrogen sulfide and hydrocarbons. The hydrodesulfurization is normally effected at a temperature of about 600° to about 1000° F. and under a superatmospheric pressure of hydrogen ranging from about 100 to 1000 pounds per square inch or more. The exact temperature to be employed in any given instance will depend upon the type of organic sulfur compounds contained in the hydrocarbon distillate being treated.

Various catalysts may be employed to effect the desulfurization, including the oxides or sulfides of molybdenum, aluminum, chromium, tungsten, vanadium, cobalt, or mixtures thereof, alone or composited with a suitable carrier or support including various clays, bauxite, and other natural or synthetic siliceous or aluminiferous materials. In addition such catalysts as metallic nickel and/or copper, as such or composited with a suitable support, may be used. Particularly preferred catalysts comprise metallic nickel, preferably composited with kieselguhr, the oxides or sulfides of molybdenum, and such composites as a mixture of the oxides of cobalt and molybdenum commingled with a support comprising alumina.

The hydrogen sulfide formed during the desulfurization process will be recovered in commingled state with hydrogen. It is generally a difficult matter from a practical viewpoint to separate the hydrogen from the hydrogen sulfide. This is accomplished in accordance with the novel features of the present invention by reacting the mixture of hydrogen and hydrogen sulfide with an unsaturated hydrocarbon and at the same time forming valuable organic sulfur compounds.

The organic sulfur compounds thus formed are of higher boiling point and may readily be separated by simple fractionation from the hydrogen originally contained in the hydrogen-hydrogen sulfide effluent product from the desulfurization process. The feature of the present invention not only permits the ready separation of hydrogen from hydrogen sulfide but in addition forms desirable organic sulfur compounds. One of the major costs in the operation of a desulfurization process employing hydrogen is the cost of the hydrogen, and it is an important feature of the present invention that the hydrogen separated in the manner herein set forth is recycled for further use in the desulfurization step of the process and this feature greatly enhances the attractiveness of hydrodesulfurization processes.

The reaction of the hydrogen sulfide contained in the hydrogen-hydrogen sulfide effluent product from the desulfurization process with an unsaturated hydrocarbon and particularly an olefin may be effected in the presence of a suitable catalyst. A particularly preferred catalyst comprises phosphoric acid and more specifically solid phosphoric acid which comprises a mixture of phosphoric acid and kieselguhr. With the solid phosphoric acid catalyst the temperature employed will be within a range of about 200° to about 500° F. and the pressure will range from atmospheric to 1000 pounds per square inch or more. Other suitable catalysts for effecting the reaction of hydrogen sulfide with an olefin include sulfuric acid, organo sulfonic acids, silica-alumina composites, both naturally occurring and synthetically produced, tungstic acid, chromic acid, etc. The temperature employed with the liquid acid catalysts is generally within the range of about 100° to about 400° F. and with the solid catalysts is within the range of about 200° to about 600° F. The pressure employed will depend upon the particular catalyst and mixtures used, but in general will range from atmospheric to 500 pounds or more.

The novelty and utility of the present invention will be further explained in connection with the accompanying diagrammatic flow drawing which illustrates one specific embodiment of the invention. It is understood that various modifications to the specific process illustrated in the drawing may be made in accordance with the broad scope of the present invention.

Referring to the drawing, the hydrocarbon distillate containing organic sulfur compounds is introduced at a suitable temperature and pressure through line 1 and is directed through valve 2 to desulfurization zone 3. In the case here illustrated zone 3 comprises a reaction zone containing a bed of suitable desulfurization catalyst not illustrated. In general the hydrocarbon distillate will be heated to the desired temperature and supplied at this temperature to the desulfurization zone. When desired, however, it is also within the scope of the invention to provide suitable external heating means for zone 3. Although zone 3 is illustrated as comprising a fixed bed reaction zone, it is also within the scope of the invention to utilize a slurry type of operation, a fluidized type of operation, or a countercurrent type of operation in which the catalyst is passed countercurrently to a rising stream of hydrocarbon vapors.

The effluent products from zone 3 are directed through line 4 and valve 5 to fractionation zone 6. Zone 6 may comprise one or a plurality of distilling or fractionating zones to separate desulfurized hydrocarbons from an overhead effluent stream comprising a mixture of hydrogen and hydrogen sulfide. Zone 6 will usually be provided with suitable heating means, such as heat exchanger, reboiler, etc., in the lower portion thereof, and suitable cooling means, such as internal refluxing or external cooling, in the upper portion thereof. The treated hydrocarbon distillate may be removed from the lower portion of zone 6 through line 7 containing valve 8 to storage or other treatment as desired. In the case here illustrated a side stream of gaseous or liquid olefinic hydrocarbons may be removed through line 9 and withdrawn from the process through line 10. In one embodiment of the invention, the side stream withdrawn through line 9 may be utilized in a subsequent step of the process in the manner to be hereinafter set forth in detail.

The overhead stream from zone 6, comprising a mixture of hydrogen and hydrogen sulfide, is withdrawn therefrom through line 11 and valve 12, and is passed through heat exchanger 13, whereby this stream is heated to the desired temperature. An olefinic hydrocarbon, which advantageously comprises butylene and still more particularly iso-butylene, is introduced through line 14, and may be directed through valve 15 to commingle with the hydrogen-hydrogen sulfide stream in line 11 prior to passing through heat exchanger 13, or the olefin may be directed from line 14 through line 16 and valve 17 to commingle with the hydrogen-hydrogen sulfide stream in line 18 after the latter has passed through heat exchanger 13. As hereinbefore set forth, in one embodiment of the invention a specific olefinic fraction may be separated in zone 6 and this olefinic fraction may be directed through line 9, line 19 and valve 20 and supplied therefrom either through valve 15 to line 11 or through line 16 and valve 17 to line 18. This embodiment of the invention will obtain only in cases where the desulfurization process leaves olefinic hydrocarbons in the effluent products and only where the fractionating zone serves to separate a narrow fraction as, for example, one consisting principally of butylenes. Under this operation zone 6 will normally comprise at least two of such zones so that a narrow olefinic fraction may be recovered for use in the manner herein set forth. In general it is preferred that the olefinic fraction comprise butylene so that butyl-mercaptan is recovered as one of the final products of the present combination process, but it is also within the scope of the invention to separate an ethylene, propylene, amylene or even higher boiling olefinic fraction for treatment in the manner set forth.

A modification of the arrangement illustrated in the drawing may comprise cooling the overhead fraction from zone 6 and collecting the hydrogen-hydrogen sulfide mixture in a receiver. The mixture may then be supplied by a suitable pump or compressor to the later stage treatment. In this method of operation a portion of the mixture collected in the receiver may be returned as a refluxing and cooling medium to the upper portion of zone 6.

In general the desulfurization step of the process will be maintained at a higher pressure than the subsequent step of the process, in which case it will be unnecessary to utilize additional pumps or compressors to transport the streams to the later step of the process. However, if it is desired to maintain fractionating zone 6 at a lower pressure than the subsequent reaction zone, it is within the scope of the invention to provide a suitable pump or compressor in line 11 for accomplishing this transfer.

The mixture of hydrogen-hydrogen sulfide and olefin in line 18 is directed through valve 21 into reaction zone 22. In the case here illustrated zone 22 comprises a reaction zone containing a fixed bed of suitable catalyst. However, it is understood that other types of operation as hereinbefore described in connection with zone 3 may be utilized for effecting this reaction. The effluent products from zone 22 are directed through line 23 and valve 24 to fractionating zone 25 which may be the same as or different from zone 6. In zone 25 hydrogen separated from the higher boiling products is withdrawn therefrom through line 26 and, while a portion thereof may be removed from the process by way of line 27 and valve 28, at least a portion of the hydrogen is recycled by way of line 29, valve 30, pump or compressor 31, line 32, valve 33, line 34, and line 1 to zone 3 for further use therein. Hydrogen from an external source may be introduced as required through line 35 and valve 36 and supplied therefrom through lines 34 and 1 to zone 3.

Zone 25 may also serve to separate an unconverted olefinic fraction, which may be withdrawn therefrom through line 37 and removed from the process through line 38, but preferably at least a portion thereof is recycled by way of line 39, valve 40 and line 18 to zone 22 for further conversion therein. The organic sulfur compound is withdrawn from zone 25 through line 41 and valve 42.

As a specific example of an operation of the process of the present invention, straight run gasoline containing organic sulfur compounds may be subjected to desulfurization in the presence of a molybdenum sulfide catalyst at a temperature of about 800° F. and under pressure of about 1000 pounds per square inch. The effluent hydrogen-hydrogen sulfide stream may be reacted with iso-butylene at a temperature of about 350° F. and a pressure of about 200 pounds per square inch.

I claim as my invention:

1. A combination process for the desulfurization of hydrocarbons which comprises subjecting a hydrocarbon distillate containing sulfur compounds to desulfurization in the presence of hydrogen, separating from the effluent products a liquid olefinic fraction and a gaseous fraction containing hydrogen and hydrogen sulfide, commingling said fractions and subjecting the mixture to treatment under conditions to react olefin with the hydrogen sulfide and to thereby permit ready separation of the hydrogen contained in said gaseous fraction, separately withdrawing said hydrogen and recycling at least a portion thereof to said desulfurization.

2. The process of claim 1 further characterized in that said desulfurization is effected in the presence of a catalyst at a temperature within the range of about 600° to about 1000° F.

3. The process of claim 1 further characterized in that the reaction of said olefin with hydrogen sulfide is effected in the presence of a solid phosphoric acid catalyst at a temperature within the range of about 200° to about 500° F.

4. The process of claim 1 further characterized in that said desulfurization is effected at a pressure greater than the pressure employed in effecting the reaction of said olefin with the hydrogen sulfide.

5. The process of claim 1 further characterized in that said hydrocarbon distillate comprises straight run gasoline.

6. The process of claim 1 further characterized in that said hydrocarbon distillate comprises crack gasoline.

7. A combination process for the desulfurization of hydrocarbons which comprises subjecting gasoline containing organic sulfur compounds to desulfurization in the presence of hydrogen and a catalyst, separating from effluent products a gaseous fraction containing hydrogen and hydrogen sulfide and a heavier fraction comprising an olefin, subjecting said first mentioned fraction to reaction with said second mentioned fraction under conditions to react the hydrogen sulfide with the olefin, and to thereby permit ready separation of the hydrogen contained in said first mentioned fraction, separately withdrawing said hydrogen and recycling at least a portion thereof to said desulfurization.

8. The process of claim 7 further characterized in that said olefin comprises butylene.

JOSEPH A. CHENICEK.

REFERENCES CITED

The following references are of record in the file of this patent:

UNITED STATES PATENTS

| Number | Name | Date |
|---|---|---|
| 1,836,183 | Nisson et al. | Dec. 15, 1931 |
| 2,076,875 | Borglin | Apr. 13, 1937 |
| 2,304,183 | Layng et al. | Dec. 8, 1942 |
| 2,315,144 | Watson | Mar. 30, 1943 |
| 2,355,366 | Conn | Aug. 8, 1944 |
| 2,376,086 | Reid | May 15, 1945 |
| 2,386,769 | Badertscher et al. | Oct. 16, 1945 |
| 2,390,099 | Harmon | Dec. 4, 1945 |
| 2,394,751 | Cole | Feb. 12, 1946 |
| 2,426,646 | Schulze | Sept. 2, 1947 |
| 2,435,545 | Lyon | Feb. 3, 1948 |

FOREIGN PATENTS

| Number | Country | Date |
|---|---|---|
| 681,078 | Germany | Sept. 14, 1939 |